United States Patent [19]

Yamauchi et al.

[11] 4,260,981

[45] Apr. 7, 1981

[54] PHYSICAL CONDITION MONITORING SYSTEM FOR DETECTION IN REMOTE PLACES

[75] Inventors: Yukio Yamauchi, Kawasaki; Takeshi Tanigawa, Machida, both of Japan

[73] Assignee: Hochiki Corporation, Tokyo, Japan

[21] Appl. No.: 35,354

[22] Filed: May 2, 1979

[30] Foreign Application Priority Data

May 4, 1978 [JP] Japan ..................... 53-53361

[51] Int. Cl.[3] ..................... G08B 26/00

[52] U.S. Cl. ..................... 340/870.11; 340/511

[58] Field of Search ..................... 340/182, 511, 524, 525, 340/171 A

[56] References Cited

U.S. PATENT DOCUMENTS

| | | | |
|---|---|---|---|
| 3,678,512 | 7/1972 | Fergus | 340/182 |
| 3,940,739 | 2/1976 | Quimet | 340/525 |
| 3,978,479 | 8/1976 | Schmitz | 340/511 |
| 4,030,095 | 6/1977 | Dalman | 340/511 |

*Primary Examiner*—Thomas A. Robinson
*Attorney, Agent, or Firm*—Jordan and Hamburg

[57] ABSTRACT

A monitoring system having physical condition detectors arranged at places remote from a central receiving device so as to detect changes in the physical condition of a matter to be observed such as temperature, light and smoke. The central receiving device impresses detection mode signals on the output portions of detectors to control the outputs thereof. When said receiving device receives an output fed from said detectors by one of detection mode signals, said receiving device displays a physical condition of matter responding to the detection mode signal, thereby enabling the physical condition of matter to be continuously observed responding to detection mode signals and according to the lapse of time.

4 Claims, 9 Drawing Figures

PHYSICAL CONDITION MONITORING SYSTEM FOR DETECTION IN REMOTE PLACES

BACKGROUUND OF INVENTION

The present invention relates to a physical condition monitoring system wherein a central receiving device feeds detection mode signals, which havve substantial signal quantities more than two in a period, to detectors having output portions. The detector outputs to the quantities detected, and said detectors are arranged at places remote from the central receiving device to enable changes in the physical condition of matter around each of detectors to be remotely detected.

British Pat. No. 1,478,952 discloses an electrical circuit for an ionization smoke detector having an output section capable of converting the resistance of a threshold component to two small and large values and thence the output to two small and large values by means of switch circuit whose operation is controlled by a combination of Zener diodes for converting the resistance of switch circuit to two small and large values responding to the voltage impressed thereon. However, this electrical circuit has such technical disadvantage of high cost and problems can not be avoided to improve this electrical circuit in such a way that the density of smoke around the detector can be continuously determined by the detector. In order to overcome this problem, the manner in which the detection signals fed from the detector can be converted to practical information by a receiving device having an accurate and simple electrical circuit is most important.

The present invention discloses a technical concept that the detection capability of detectors can be changed by changing the output condition of output portions of detectors, that is, the physical quantity of matter such as smoke, temperature and light can be continuously detected as a function of the lapse of time in a wide range ranging from a relatively small quantity to a relatively large quantity, by continuously feeding detection signals (the measuring method in which detecting points can be freely changed in a wide range as stated above will be referred to hereinafter as a detection mode search), and another concept that when detection mode alternation signals fed from the receiving device to the remote detectors in order to attain detection mode operation cause detection outputs to be fed, the physical quantity of matter around the detectors and detected by the detectors can be accurately discriminated by the receiving device using the signal level itself of detection mode alternation signals in the display portions of receiving device. Therefore, the present invention is intended to provide a useful electrical system capable of preventing signals transmitted from being complicated by a combination of these technical concepts, and transmitting simpler signals through a simpler circuit between the receiving device and detectors.

SUMMARY OF INVENTION

Since the physical change of matter such as smoke, temperature and light is a parameter employed to make judgement in a variety of fields such as various measurements and observation of factory security and production line, it is desirable and useful to detect a predetermined reference value responsive to an object, to detect the parameter approaching the reference value thereby making earlier forecast and preparation possible, and to detect the parameter changing to more than the reference value thereby enabling later treatment or emergency preparation. Detection mode search should be performed covering a wide range centering on the reference value. The central receiving device and various terminal detectors are precisely connected to one another through a first power line for feeding electric power, a second power line for transmitting detection mode alternation signals, and a third power line for transmitting detected signals. They may be connected to one another by means of two power lines using a common power line instead of first and third lines. When it is enough to know at an earlier stage that a physical change of matter to be observed has occurred at one of places where the detectors are arranged, an observation system can be obtained by means of either two or three power lines. When it is necessary to know the place where the detector has sent a detection signal, each of detectors and the receiving device are connected to one another by means of third independent detection signal power line so as to substantially reduce the cost. The system of present invention enables an extremely high information process to be attained even if the most economical ON-OFF signals are employed as detection signals. Detection mode signals for searching the range of physical changes of matter to be measured are based on one period slope voltages having a voltage difference required to attain the search or subslope voltages whose voltage increases in step-like manner in a period and detection information of physical change of matter to be observed can be selected more than three from this range of voltage difference. An earlier detection point, reference detection point and later detection point can be freely selected as information in the predetermined range of physical change of matter.

In a basic circuit means, the receiving device comprises power lines, a slope voltage generating circuit which is controlled to perform periodic operations, a first switching circuit for receiving signals from the detectors, and a detection mode reading circuit to which the outputs of first switching circuit and the slope voltages are applied and including display portions, while the detection device comprises detectors suitable for detecting the physical change of matter such as smoke, temperature and light, and rendered operative by electrical power supplied through the power lines, an output circuit of detectors to which the slope voltages are applied, and a second switching circuit rendered operative by the outputs of the output circuit. A preferable repeat period of detection mode alternation signals is in the range of 0.5 sec.-5 sec. It is preferable that smoke density detection is carried out by means of an ionization smoke detector or light scattering smoke detector, that temperature detection is by means of thermistor or semiconductor, and that light detection is by means of semiconductor.

DETAILED DESCRIPTION OF PREFERRED EMBODIMENTS

Figure 1:
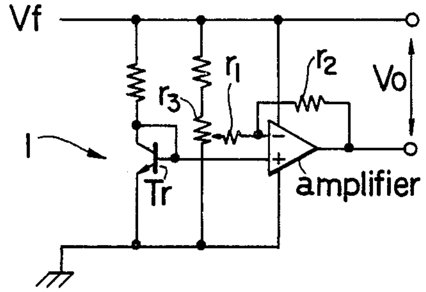
FIG. 1 shows a temperature detection circuit using a semiconductor.

FIG. 1 shows an example of temperature detector in ʼhich the temperature characteristic of base-emitter oltage $V_{BE}$ of a transistor Tr is utilized. Forward volt- ges appearing at the PN junction of transistor show a near change having a negative coefficient relative to :mperatures, assuming that forward current is con- :ant. Temperature detection is made easy by the values f base-emitter voltages $V_{BE}$ of transistor which is con- ected through a diode. Output values relative to tem- eratures can be determined in a desired range by ad- ısting the temperature coefficient V/c through resis- ›rs $r_1$ and $r_2$, and by setting a resistor $r_3$. It is possible to ttain an accuracy of $\pm 3°$ C. The slope of outputs $v_o$ is .1/° C., resulting in 2 V at 0° C. and 12 V at 100° C.

Figure 2:
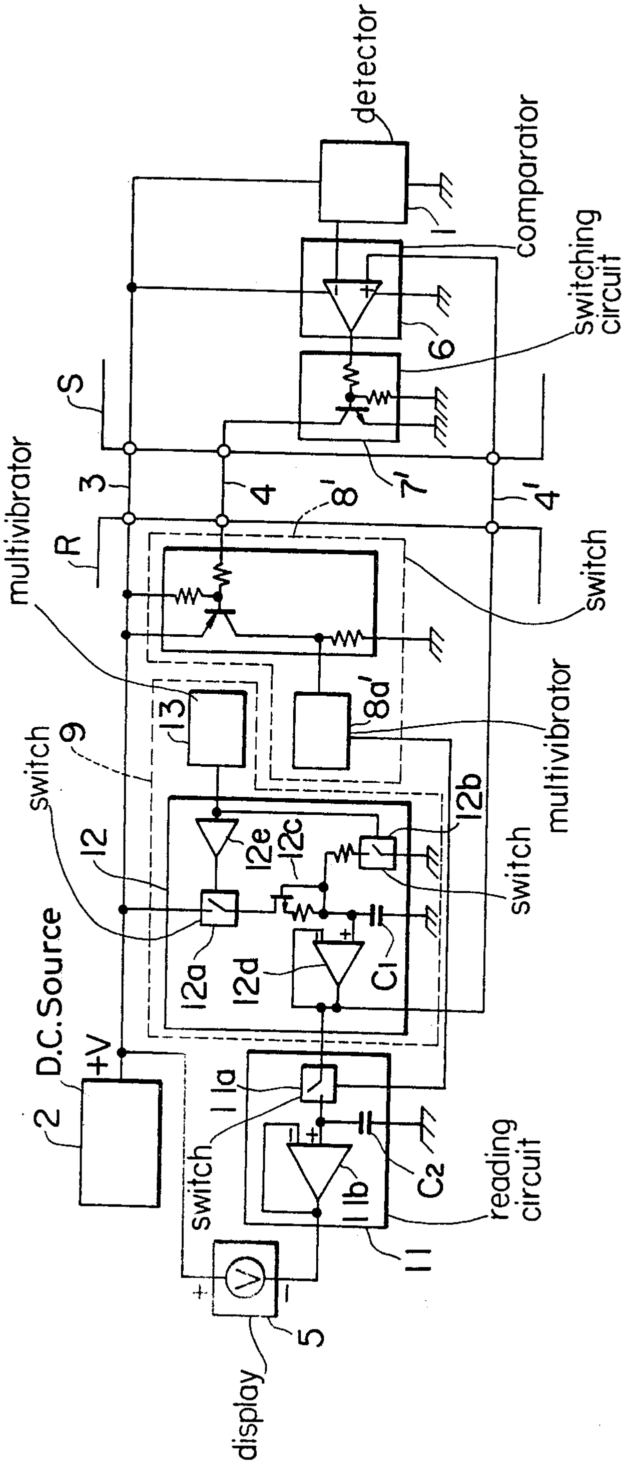
FIG. 2 shows an example of physical condition observation system circuit.

FIG. 2 shows an embodiment of present invention in ʼhich the transistor temperature detector 1 shown in 'IG. 1 is employed. In an end detection device S the ıutput of detector 1, to which current is supplied from power source 2 of a receiving device R, is connected ɔ the low potential terminal of a comparator 6, and lope voltages are impressed on the high potential ter- ninal thereof. When a combination is established be- ween a slope voltage value intended to give a predeter- nined potential difference and a temperature detection 'alue detected by the detector 1, the comparator 6 gives n output to send an ON-signal to the receiving device ₹ through a second switching circuit 7'. It will be un- lerstood that temperature can be always observed in a emperature range which forms a predetermined poten- ial difference relative to the maximum and minimum 'alues of slope voltages.

A slope voltage generation circuit is constructed as 'ollows in the receiving device R. A C-MOS bilateral witch 12*a* is connected in series with a power line 3 etween a DC power source 2 and a grounded point of ›ower line 3. The control terminal of switch 12*a* of a :onstant-voltage circuit 12*c* is connected to the output erminal of an inverter 12*e* the inverter being connected o a stable multi-vibrator 13 for determining a period. The control terminal of a C-MOS bilateral switch 12*b* :onnected between the output of constant-voltage cir- :uit 12*c* and a grounded point is connected to the input ›f inverter 12*e*. An output of timer 13 renders the first witch 12*a* operative and at the same time opens the econd switch 12*b*, causing the capacitor $C_1$ to start charging with power source current. An amplifier 12*d* connected to the plus electrode of capacitor $C_1$ gives as an output a predetermined slope voltage corresponding to the charging period, said slope voltage being applied through a control line 4' to the detection device S. The high potential terminal of comparator employed in the output section 6 of detector 1 of detection device S receives this slope voltage as an input.

A first transistor switching circuit 8' for receiving ON signals from a signal power line 4 is connected to a mono-multivibrator 8*a*' at the output terminal thereof to maintain the output of circuit 8*a*' for a time length re- quired to display or read said output. A C-MOS bilat- eral switch 11*a* of a detection mode reading circuit 11 receives the outputs of second timer 8*a*' at the control terminal thereof and the outputs of a slope voltage am- plifier 12*d* at the input terminal thereof. To the output terminal of switch 11*a* is connected an amplifier 11*b* to amplify the output of amplifier 12*d* when the switch 11*a* is closed, thus rendering a display device 5 operative.

Figure 3:
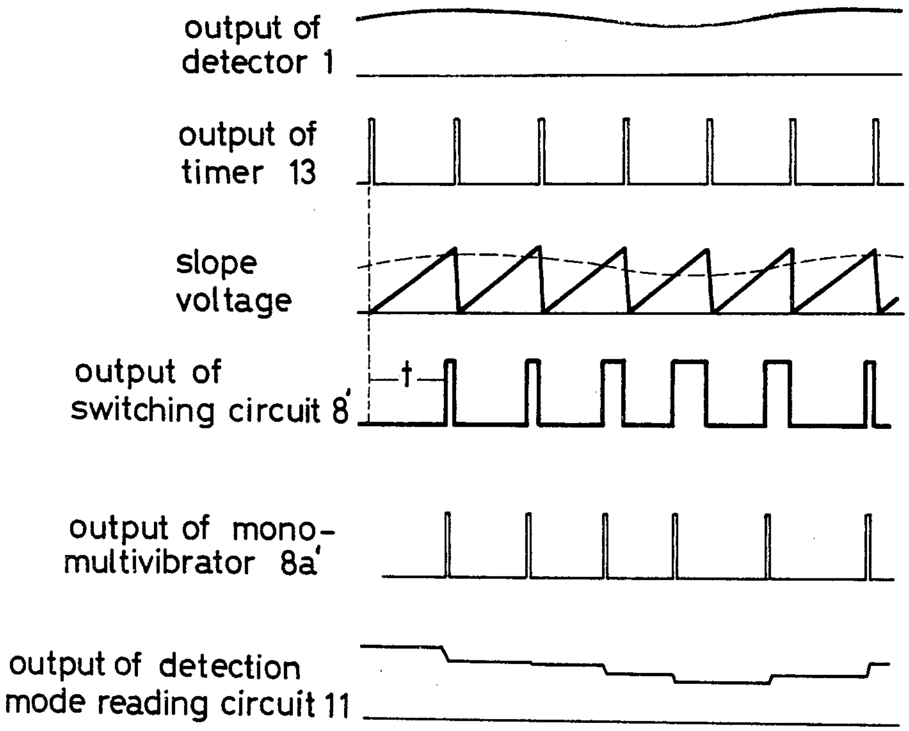
FIG. 3 is a time chart of circuit shown in FIG. 2.

FIG. 3 is a time chart showing the operational rela- tion of system shown in FIG. 2. When ambient tempera- ture rises and the output of detection section 1 is low- ered ranging from the second period to the fourth per- iod of time chart, the high voltage portion of slope voltages causes the switch circuit 8' to give a detection signal at the initial stage of temperature rise. The mono- multivibrator 8*a*' which has received this detection signal turns the bilateral switch 11*a* "ON" and applies this high voltage portion to the amplifier 11*b* as an input, thus generating an output as shown in the time chart for rendering the display device 5 operative. The display of display section 5 varies with the progress of period to show how the physical condition of a matter to be observed develops. In the system having a display function to discriminate whether the output of switch- ing circuit 8' is generated at an earlier or later stage relative to the period of time 13 as shown in the time chart, the change in physical quantity can be discrimi- nated responding to the shortness of this time duration.

Figure 4:
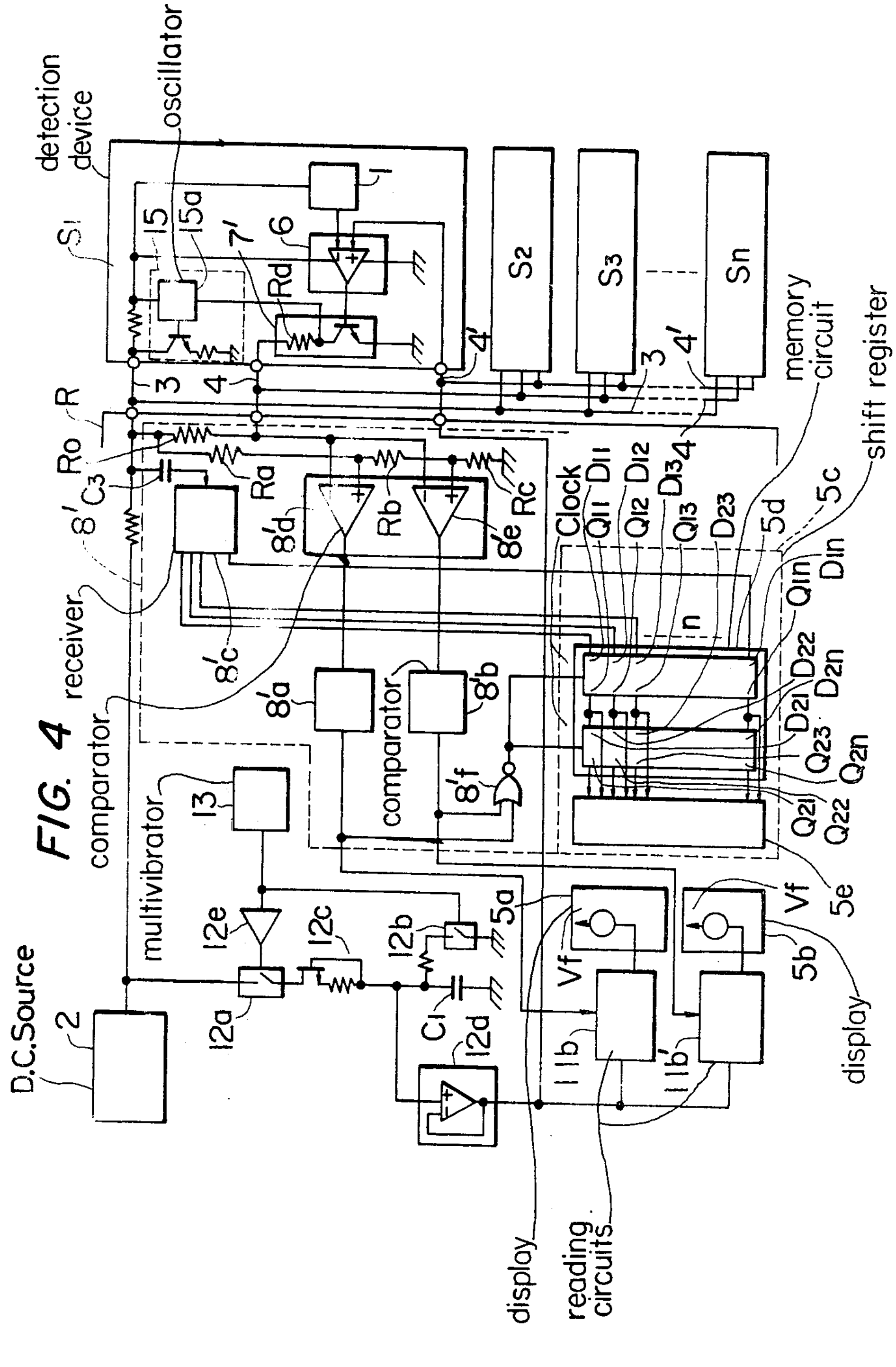
FIG. 4 is a circuit diagram showing an embodiment of present invention in which the position of operated detector and the physical quantity of matter corre- ıonding to first and second detection outputs are dis- ayed.

FIG. 4 shows an embodiment of present invention capable of discriminating and reading the displays of first and second detectors which have given detection signals, the detected physical quantities of first and second detection signals which have been given earlier, or the combination of them. In each of detection de- vices $S_{1-n}$ a natural frequency generating circuit 15 hav- ing a tuning fork oscillator 15*a*, each of oscillators hav- ing a frequency different from one another, is connected between the input terminal of second semiconductor switching circuit 7' and the power line 3. When the switching circuit 7' is turned "ON", this circuit 15 oscil- lates to impress the natural frequency thereof on a natu- ral frequency receiving circuit 8'*c* of receiving device R through the power line 3. The input terminal of circuit 8'*c* is connected to the power line 3 through a capacitor $C_3$ and the output terminals thereof to the data terminals of a second memory circuit 5*d* of a shift register. In addition, the potential terminals of comparators 8'*b* and 8'*d* are connected through a control resistor Ro to the power line 3, respectively, and the high potential termi- nal of control resistor Ro is grounded through dividing resistors Ra, Rb and Rc. The high potential terminal of comparator 8'*d* is connected to the connecting portions of resistors Ra and Rb, and the high potential terminal of a comparator 8'*e* to the connecting portions of resis- tors Rb and Rc, respectively. The high potential termi- nal of the former is set higher in potential than the predetermined potential of high potential terminal of the latter. The low potential terminal of control resistor Ro is connected to the semiconductor input terminal of switching circuit 7′ of detection device S, wherein a resistor Rd is inserted.

The output portion 6 of detection devices $S_{1-n}$ which has given detection outputs responding to detection mode alternation signals turns the switching circuit 7′ "ON" to cause the natural frequency generating circuit 15 to oscillate to generate potentials across control resistor Ro, thus impressing a constant dividing voltage on the low potential terminal of comparator 8′d through the resistors Rd and Ro of the detection device Se which supplies the first output. As the resistor Rd of detection device Sk, which supplied the second output second, is added, Rd+Rd acts on the control resistor Ro to cause the potential at the low potential terminal of resistor Ro to be further lowered, thereby rendering the second comparator 8′e operative. There is little fear that the detection devices $S_{1-n}$ supply their detection outputs at the substantially same time, because they are properly positioned in a useful space so as to attain effective observation.

The output terminals of comparators 8′d and 8′e are connected to the input terminals of mono-multivibrators 8′a and 8′b, respectively, to maintain outputs for a time length required to display or read them. The output terminals of timers 8′a and 8′b are connected through a NOR circuit 8′f to the clock terminals of first and second stages of a shift register 5c. Therefore, when the timer 8′b applies a signal to the clock terminal of second stage shift register, the natural frequency signal stored in the data terminal of first stage shift register is applied to a display device 5e to be displayed thereon. The detection devices Se and Sk are displayed.

The output terminals of mono-multivibrators 8′a and 8′b are connected to the detecting mode reading circuits 11b and 11b′, respectively, and when this circuit 11b is closed, the signal level of detector mode alternation signals impressed on the input terminal of circuit 11b is displayed in the display section 5a while when the circuit 11b, is closed, the signal level is displayed in a display section 5b. The mode signal level of earlier values is displayed in the display section 5a and the mode signal level of values closer to a reference value is displayed in the second display section 5b. When the display device 5e is provided with display sections having connecting portions connected to output terminals $Q_{11-1n}$ corresponding to the data terminals $D_{11-1n}$ of first stage shift register of memory circuit 5d and to the data terminals $D_{21-2n}$ of second stage register, and further with display sections corresponding to output terminals $Q_{21-2n}$, it is possible to discriminate and read first and second outputs from the same detection device S.

Figure 5:
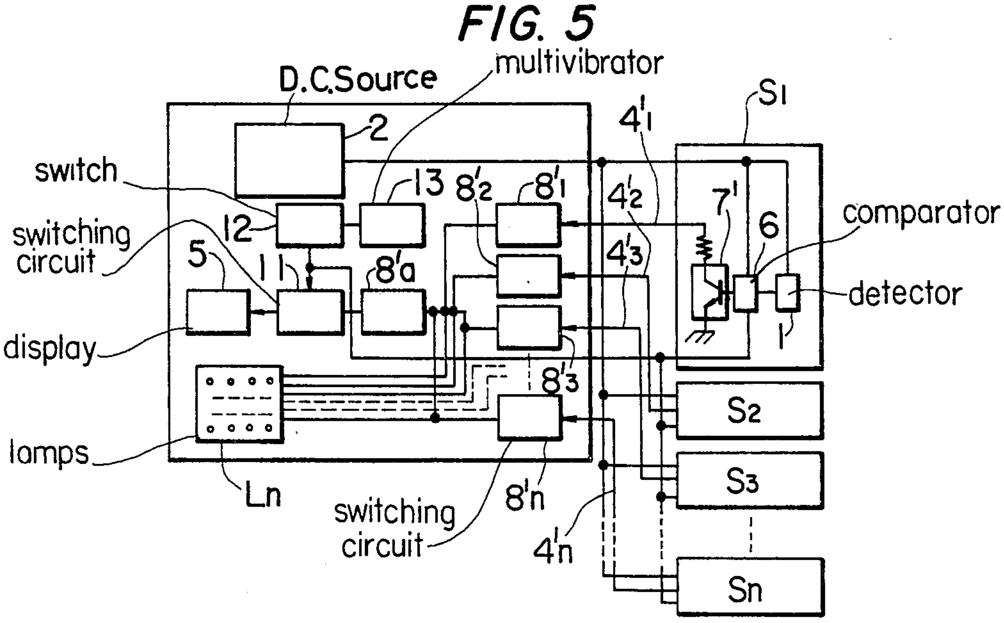
FIG. 5 is a circuit diagram showing an embodiment ' the present invention in which the detection signal ›wer lines for the detectors are made independent om one another and the receiving device is provided ith switching circuits corresponding to the detection gnal power lines.

FIG. 5 shows an example of system wherein the output terminals of second switching circuit 7′ contained in the detection device S are formed as independent ones $4'_{1-n}$ and first switching circuits $8'_{1-n}$ corresponding to these independent terminals are employed in the receiving device R. Display lamps $L_n$ are economically used corresponding to the output terminals of first switching circuits $8'_{1-n}$.

Figure 6:
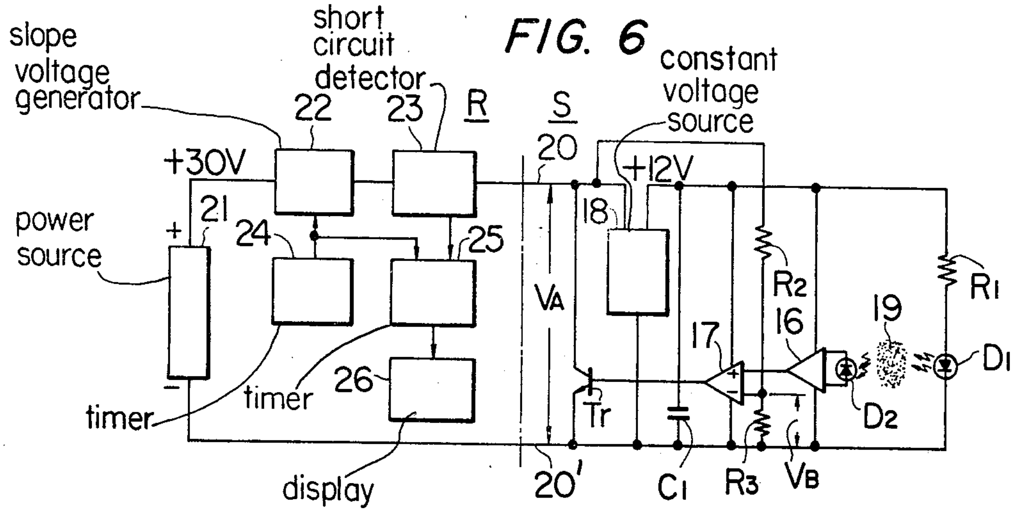
FIG. 6 is a circuit diagram showing an embodiment ' present invention in which smoke density is em- oyed as a matter to be detected and a light scattering noke detector is used.

FIG. 6 shows an embodiment of present invention wherein the observation device is used as a smoke detector of the light scattering type for detecting smoke density. In FIG. 6 the detecting section S comprises a luminous diode D1 which serves as a light source, a photodiode D2 for receiving the scattering light from the luminous diode D1 responding to the density of smoke 19 and converting the received scattering light to an electrical signal, an amplifier 16 for picking up a detection voltage which corresponds to the density of smoke, from the current flowing through the photodiode D2, a voltage comparator 17 for comparing the output voltage of amplifier 16 with the dividing voltage of resistors R2 and R3, a voltage means 18 for keeping the power source voltage in the detecting section S constant, and a transistor Tr which serves as a switching element for short-circuiting signal lines 20 and 20′ connecting the detecting and receiving sections R and S at the input side of constant voltage means 18 by the output of voltage comparator 17. On the other hand, the receiving section R comprises a power source 21, a slope voltage generating circuit 22 for changing the detection sensitivity of receiving section R, a short-circuit detection circuit 23 for detecting the short-circuit of signal lines 20 and 20′ due to the conductivity of transistor Tr, a first timer 24 for feeding a pulse to determine the slope voltage generating period of slope voltage generating circuit 22, a second timer 25 which serves as a condition detecting circuit operated and re-set by the output of first timer 24 and stopped by the detected output of short-circuit detection circuit 23 so as to pick up a time duration during which the transistor Tr of detecting section S is made conductive, and a display means 26 for displaying the smoke density in the detecting section S responding to the time value of second timer 25.

Figure 7:
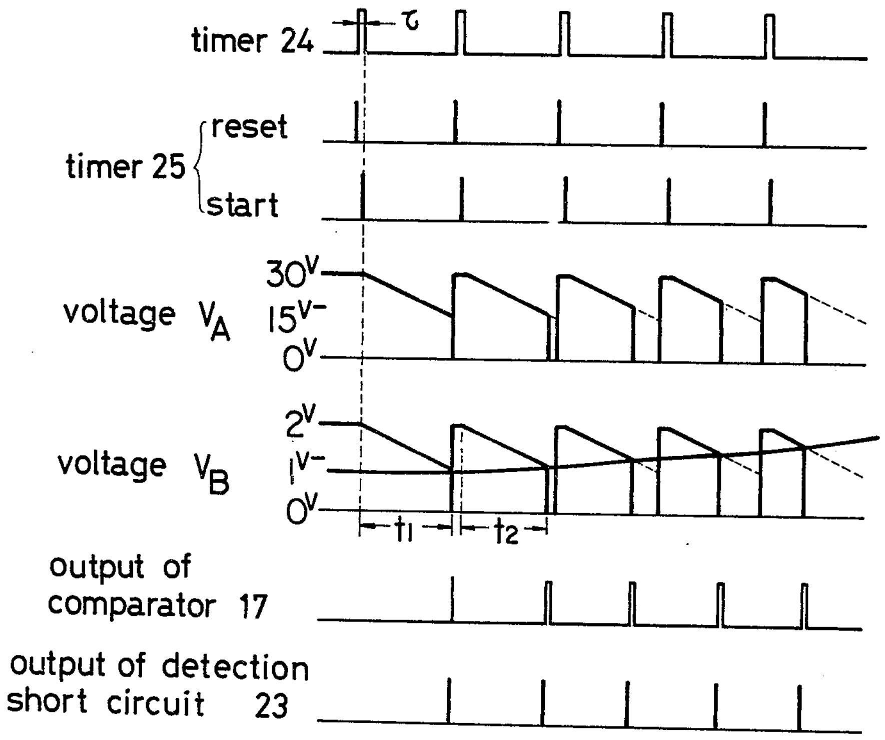
FiG. 7 is a time chart of circuit shown in FIG. 6.

The operation of embodiment shown in FIG. 6 will be described with reference to a time chart in FIG. 7 in which signal waves of each section are shown. The first timer 24 of receiving section R feeds pulses having a pulse width $\tau$ at a constant time period. The second timer 25 is reset by the leading edges of pulses of timer 24, and the timer 25 and the slope voltage generating circuit 22 are started by the subsequent trailing edges of pulses of timer 24. The slope voltage generating circuit 22 made operative by the starting pulse causes the supply voltage $V_A$ to the detecting section S to be reduced at a predetermined time slope. The reduction of this supply voltage $V_A$ appears as a change in the reference voltage $V_B$ due to the dividing resistors R2 and R3 of detecting section S, and when the reference voltage $V_B$ becomes lower than the output voltage of amplifier 16 or the smoke density detection voltage thereof, the voltage comparator 17 generates a discrimination output to render the transistor Tr conductive, thereby short-circuiting the signal lines 20 and 20′.

This short-circuit is detected by the short-circuit detecting circuit 23 of receiving section R to stop the second timer 25. Therefore, as the counting time $t_1$ during which the second timer 25 is started and stopped depends on the density of smoke 19 in the detecting section S, the density of smoke is displayed in the display means 26 based on this time $t_1$. The above-mentioned process is repeated to detect the density of smoke in the detecting section S according to the lapse of time.

Figure 8:
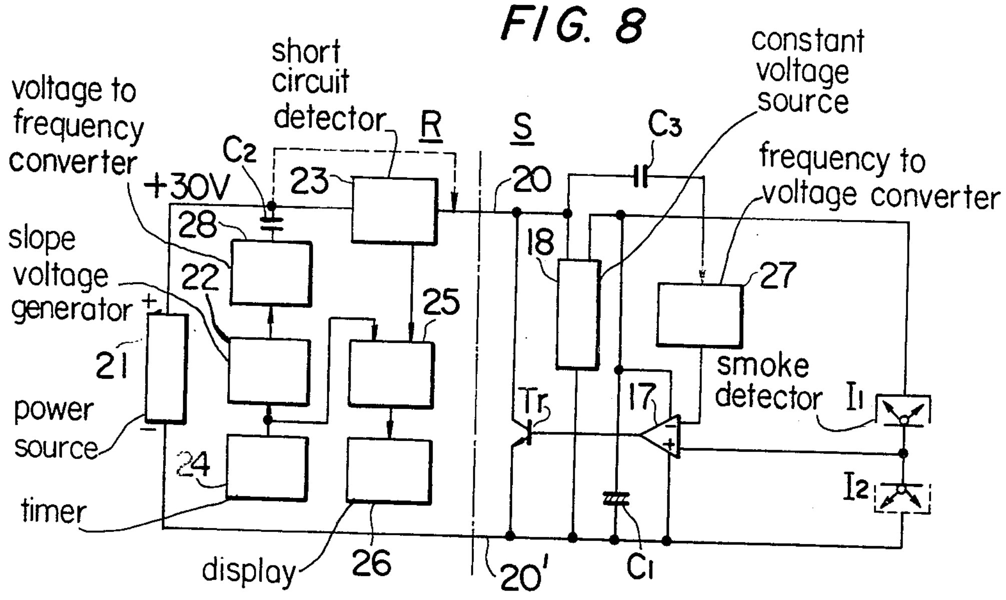
FIG. 8 is a circuit diagram showing an embodiment f present invention in which an ionization smoke de- :ctor is employed.

FIG. 8 shows an embodiment of present invention wherein smoke detectors $I_1$ and $I_2$ of ionization type are connected to the circuit of FIG. 6 and the connecting portions of these smoke detectors are connected to the output portion 17. In this embodiment the sensitivity change of detecting section S is frequency responsive. The same reference characters are employed on same parts in FIG. 8 as those in FIG. 6 and the description thereof is omitted.

In FIG. 8 the receiving section R is provided with a V/F conversion circuit 28 for converting the voltage output of slope voltage generating circuit 22 to a change in frequency and the output of V/F conversion circuit 28 is applied to the input or output side of short-circuit detecting circuit 23 through a coupling capacitor $C_2$. On the other hand, the detecting section S is provided with a F/V conversion circuit 27 for converting the frequency signal, which is transmitted through the signal line 20 and a coupling capacitor $C_3$, to s DC voltage, and the output of this F/V conversion circuit 27 is used as a reference voltage for the voltage comparator 17. Therefore, the voltage change of slope voltage generating circuit 22 is fed as a change in frequency to the detecting section and again reversely converted to a change in voltage to change the reference voltage of voltage comparator 17, so that smoke density can be remotely detected by changing the output level of detecting section in same way as in the embodiment shown in FIG. 6.

Figure 9:
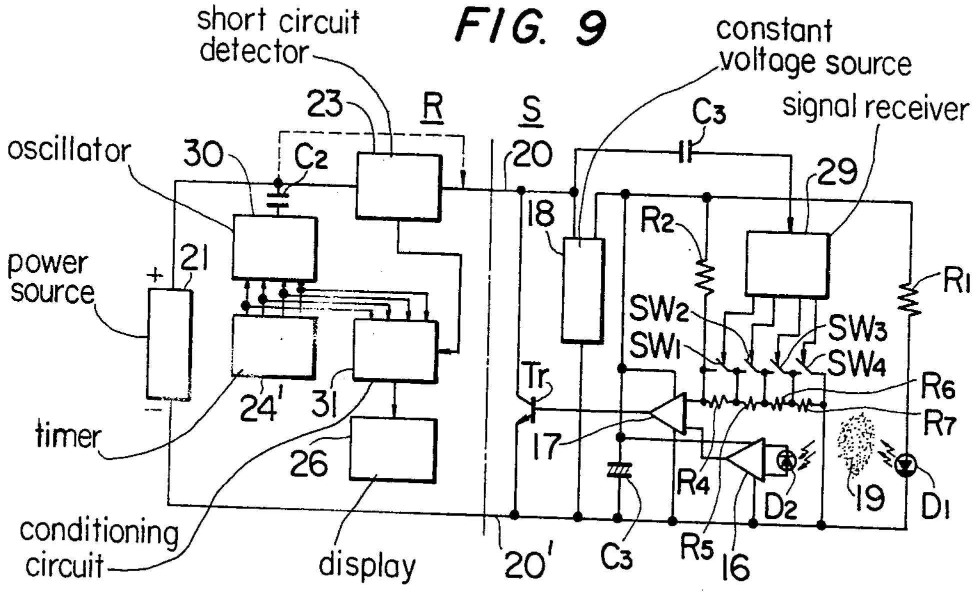
FIG. 9 is a circuit diagram showing an embodiment f present invention a circuit being included to change ıe detector output portions in step-like manner in a eriod.

FIG. 9 shows an embodiment of present invention wherein frequency is changed to change the sensitivity of detecting section, this embodiment being characterized in that the sensitivity of detecting section S is changed not continuously as in the above-mentioned embodiments but in step-like manner.

In the embodiment shown in FIG. 9, the slope voltage generating circuit is omitted, the timer 24' applies to a frequency signal generating circuit 30 a code signal required to make mode changes in more than two stages at a constant time period, this code signal is fed to a frequency signal receiving circuit 29 as plural frequency combination codes corresponding to code bits, semiconductor switches $SW_1$–$SW_4$ (C-MOS bilateral switches) are changed over by the code signal connected by the frequency signal receiving circuit 29, the reference voltage of voltage comparator 17 is changed in step-like manner. When the reference voltage is lower than the output voltage of amplifier 16 at this time, the transistor Tr is rendered conductive to short-circuit the signal lines 20 and 20', so that a physical condition circuit 31 of receiving section R causes the display means 26 to display a smoke density responding to the code signal fed from the timer 24'. Since the smoke density attained by this embodiment is readily determined responding to the mode level which is changed in step-like manner, measurement accuracy is lowered. However, this embodiment has such advantages that the mode level by which the smoke density is discriminated can be set in plural stages and that one time mode change cycle can be substantially shortened as compared with those attained by the embodiments above described.

In the case of embodiments shown in FIGS. 6 through 9, the detection mode change is attained by changing the reference voltage of voltage comparator. However, the feedback resistance or amplifying rate of amplifier 16, or the value of resistor R1 may be changed using same signal as in these embodiments. Current flowing through the diode must be controlled to change the luminous characteristics of the diode. Resistance value can be changed in step-like manner by means of semiconductor switches as shown in FIG. 9, but it may be continuously changed by means of voltage resistance conversion elements such as FET.

When temperature is to be detected as one of physical quantities which change in the development of fire, the present invention makes it possible to be aware of the outbreak of fire at an earlier stage of 40° C. and to search the development of fire to a stage of 70° C. at which warning should be issued, then further to a stage of 120° C., at which detection is made unnecessary, by setting the range of detection mode from 40° C. to 120° C.

When smoke density is to be detected, the present invention enables completely practical fire observation to be attained in such a way that smoke density can be detected from 5% to 50%, smoke density of 5% representing an initial stage of fire, 10% a stage at which the break of fire should be announced, and 10%–15% at which warning should be issued.

What is claimed is:

1. A monitoring system comprising:

a constant voltage power source, a circuit means connected to said power source for generating detection mode alternation signals, an AND means having first and second input terminals, means applying said detection mode alternation signals to said first input terminal, a display portion coupled to the output of said AND means, a receiving means comprising a switching means connected to said power source, said switching means having a control terminal, the output terminal of said switching means being connected to the second input terminal of said AND means, a detecting means connected to said power source for detecting a predetermined physical quantity through the electrical power of said power source, and a detection device connected to said detecting means and having an output control means with an output control terminal, said detection device being connected to apply an output corresponding to the physical quantity detected by said detecting means on the control terminal of said switching means, the output control terminal of said output control means being connected to receive the output of said detection mode alternation signal generation means.

2. The monitoring system according to claim 1 comprising a plurality of further detection devices, in which said switching means comprises a plurality of switches corresponding to said detection devices, and said display means comprising means for displaying the position of each of said detection devices, the outputs detected by said detection devices being applied to the corresponding switches, said AND means including a plurality of AND circuits, the output terminal of each of said switches being connected to the second input terminal of separate AND circuits, said display means being connected to the output terminal of each of said switches.

3. The monitoring system according to claim 1 in which said detection mode alternation generator means comprises:

a first stable multivibrator circuit, an inverter connected to the output terminal of said multivibrator circuit, a first switching element having a control terminal connected to the output terminal of said inverter, and a second switching element having a control terminal connected to the output terminal of said multivibrator circuit, said first and second switching elements being opened and closed in reverse relation to each other, a capacitor connected to the output terminal of said first switching element, and an amplifying means connected to amplify the charging voltage of said capacitor;

said AND means comprising a third switching element having a control terminal connected to said amplifying means, and an amplifying means connected to the output terminal of said third switching element;

said switching detection means comprising a transistor switching element connected to said power source, the control terminal of said transistor switching element being connected to the output of said detection device, and a monostable-multivibrator connected to the output terminal of said transistor switching element, and having an output terminal connected to the control terminal of said third switching element of said AND means;

said output control means comprising a comparator having a first input terminal connected to the output terminal of said detection section and a second input terminal connected to the output terminal of said amplifier of said detection mode alternation signal generation means; and a transistor switching element having a control terminal connected to the output terminal of said comparator and an input terminal connected to the control terminal of a transistor switching element of said switching detection means.

4. The monitoring system according to claim 1 comprising a natural frequency receiving circuit connected to said power source by way of a capacitor, first, second and third dividing resistors connected in series between said power source and ground, a first comparator having a high potential input terminal connected to the junction of said first and second resistors, a second comparator having a high potential input terminal connected to the junction of said second and third resistors, the low potential terminals of said first and second comparators being connected to one terminal of a control resistor, the other end of the control resistor being connected to the high potential terminal of said first resistor, a dividing resistor connected between the junction of said comparators and said control resistor and the input terminal of said transistor switching element of said detection devices, a natural frequency oscillator circuit connected between the input terminal of said transistor switching element and said power source, a memory circuit of the two stage shift transistor type and having data terminals corresponding to the detection devices and connected to the output terminals of said natural frequency receiving circuit, said memory circuit having two clock terminals connected to the output terminals of said first and second comparators by way of a NOR circuit, and a display portion connected to the output terminals of said memory circuit.

* * * * *